United States Patent [19]
Conn, Jr.

[11] 3,854,054
[45] Dec. 10, 1974

[54] CAR WASH CONTROL APPARATUS

[76] Inventor: Robert O. Conn, Jr., 15520 Quito Rd., Monte Sereno, Calif. 95030

[22] Filed: Dec. 18, 1972

[21] Appl. No.: 316,300

[52] U.S. Cl.................. 307/41, 15/DIG. 2, 134/45
[51] Int. Cl............................................. H02j 1/00
[58] Field of Search................... 15/DIG. 2; 134/45; 307/113, 115, 41; 317/139; 200/61.41

[56] References Cited
UNITED STATES PATENTS

| | | | |
|---|---|---|---|
| 3,236,960 | 2/1966 | Larson | 200/61.41 |
| 3,391,700 | 7/1968 | Lawter | 134/45 |
| 3,534,351 | 10/1970 | Harnden, Jr. et al. | 250/221 X |
| 3,627,093 | 12/1971 | Greenwald | 134/45 X |
| 3,651,830 | 3/1972 | Kollmai | 134/45 X |
| 3,742,222 | 6/1973 | Endl | 250/221 X |

Primary Examiner—Robert K. Schaefer
Assistant Examiner—William J. Smith
Attorney, Agent, or Firm—Warren, Rubin & Chickering

[57] ABSTRACT

A control apparatus for a car wash having a vehicle conveyor for transporting a vehicle through a plurality of devices is disclosed having electronic means for sensing a vehicle entering the car wash line, its length, and its progress along said conveyor. The control apparatus has electronic circuitry responsive to the above electronic means for selectively energizing the car wash rinsing, sudsing, brushing, waxing, drying devices and the like in advance of the vehicle entering the respective devices and selectively de-energizing said devices following the vehicle leaving the devices, the devices thereby preferably being selectively energized for a period longer than the duration of the passing of the vehicle through the devices. Further electronic apparatus is provided enabling the prolongation of the operation of one of the devices so long as devices upstream on the conveyor from the device to be prolonged are energized due to the presence of a vehicle. Additional electronic means integrated with the above control apparatus enables the car wash operator to selectively preset a device, at the time a vehicle is introduced to the conveyor line, to energize at a subsequent time and at a downstream location for that vehicle only. A manually programmable patch panel is additionally provided enabling installation personnel and the car wash operator to alter the timing of the energizing and de-energizing of the devices to suit the needs of the specific car wash layout.

12 Claims, 6 Drawing Figures

Blower Circuitry

Waxer Circuitry

CAR WASH CONTROL APPARATUS

The invention relates to control apparatus for a car wash conveyor system in which a vehicle is transported through a series of devices which wash, rinse, wax, and dry the vehicle.

The advent of the automatic car wash in which a customer may have his vehicle transported very quickly through a series of devices which wash his car has caused a need for control equipment for the conveyor line. Present car washes accomplish the energization and de-energization of the various pieces of equipment used to rinse, suds, wax, and dry, the customer's vehicle by means of mechanical rods or wands which are tripped as the vehicle passes the station associated with the wand, and which are usually connected to electrical, hydraulic, or pneumatic apparatus for energizing the car wash devices. However, the mechanical wands have a number of disadvantages associated with their use. First, the wands have been found to have a high failure rate resulting from breakage and associated mechanical problems, resulting in wasted water and power, incomplete washes, and high maintenance and replacement costs. Furthermore, a common customer complaint is that the wands scratch or mar vehicles passing through the conveyor line.

Additionally, in many car washes the final operation is a large capacity blower which functions to dry the washed vehicle before it is driven out of the car wash. Such heavy duty motorized equipment have large starting loads, expending significant power in coming up to full operating condition. Moreover, the constant cycling of the machinery on and off causes premature wear which may be avoided by significantly less starting and stopping of the equipment. Finally, in many car wash lines an attendant must interrupt his normal duties to manually start and stop the blower, resulting in a reduction in manpower and inefficiency.

Finally, there are certain car wash operations such as waxing or brush and blower raising, which must be selectively activated by the car wash operator according to the wishes of the customer or the size of the vehicle. In many presently operating car washes an attendant has to be stationed at an observation point where he can activate on a selective basis the car wash operation of concern. Again, therefore, an attendant must interrupt his other tasks and respond frequently to the observation point with resulting inefficiency and higher labor costs.

Accordingly, it is a general object of the present invention to provide a car wash control apparatus which will alleviate the foregoing disadvantages and provide all of the required and optional functions in an effective, economical, and dependable manner.

It is a specific object of the present invention to provide a car wash control apparatus which reliably energizes and de-energizes each of the devices associated with the car wash line such that the device of concern is on at full strength and effect when a vehicle enters the car wash station associated with the device and off only following the departure of the rear of the vehicle from the associated station.

It is a further object of the present invention to provide car wash control apparatus which has the capability of prolonging the operation of an energized device not only when a vehicle is in the car wash station associated with the device but also when other vehicles are in other car wash stations and approaching the device of concern.

Still another object of the present invention is to provide a car wash control apparatus which enables the car wash operator to preset on a selective basis one of the car wash devices at the time he introduces the vehicle to be serviced into the conveyor line and yet have the concerned device energize at a subsequent time when that vehicle passes the station associated with the device and for that vehicle only.

It is yet another object of the present invention to provide a car wash control apparatus which may be easily programmed by installation personnel or the car wash operator to suit the needs of the specific car wash and/or to provide adjustments in the case of alterations in car wash layout and device positioning.

An additional object of the present invention is to provide a car wash control apparatus of the type abovedescribed which is wholly integrated into one control unit, is easy to install, operates with high efficiency, is relatively inexpensive to manufacture, and has a high reliability.

The invention possesses other objects and features of advantage, some of which will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings.

Figure 1:
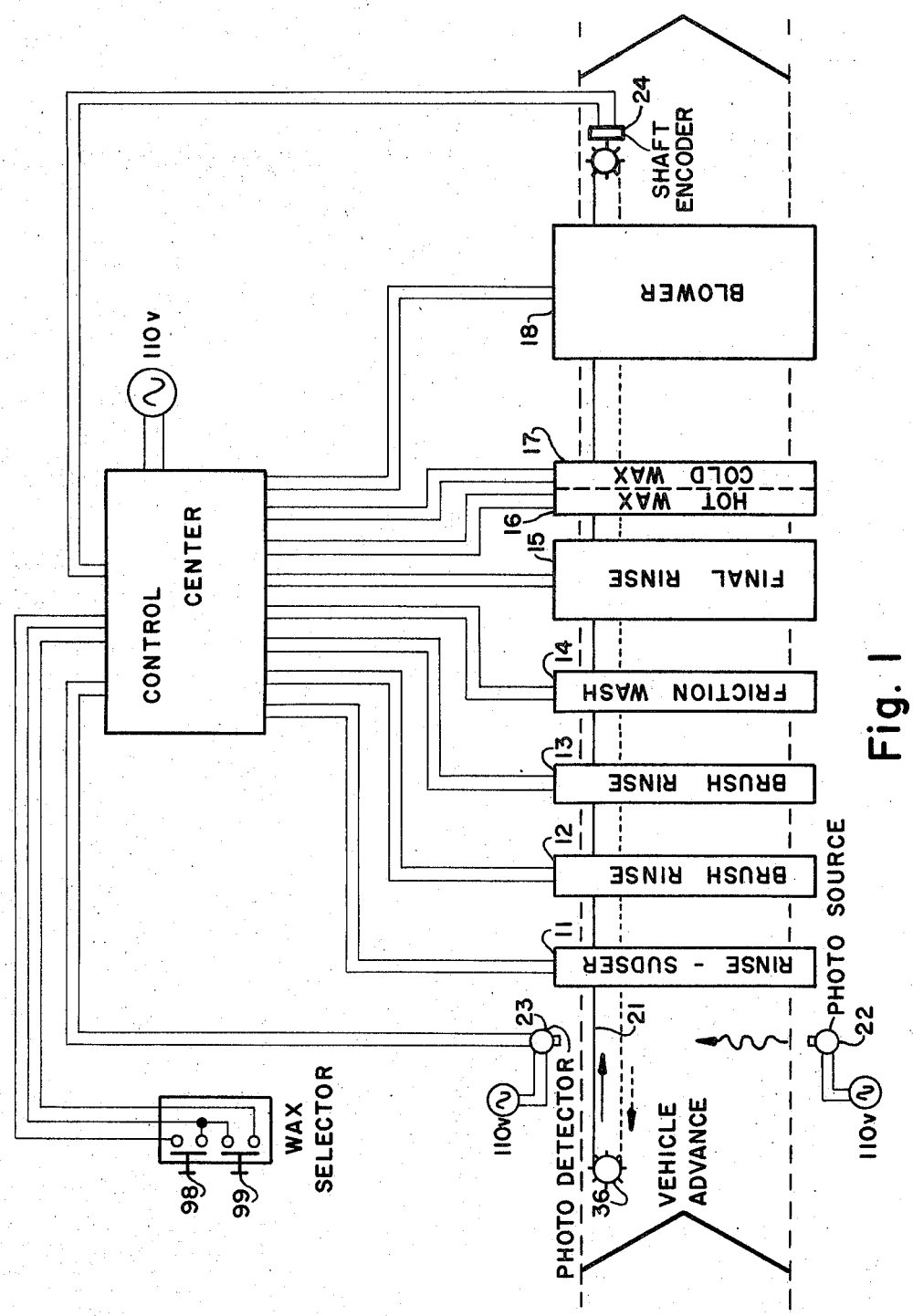
FIG. 1 is a diagrammatic representation of part of the car wash control apparatus of the present invention in association with a typical car wash conveyor line.
Figure 6:
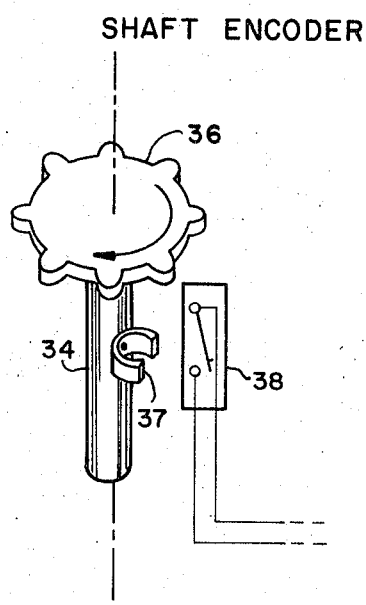
FIG. 6 is a diagrammatic representation of the shaft encoder apparatus of the present invention.

Referring now to FIG. 1, a typical car wash line will be seen to include a plurality of stations 11-18 housing a series of car wash devices for rinsing, brushing, washing, waxing, and drying (diagrammatically represented in FIG. 2 at 46), for instance, through which a vehicle is transported by means of conveyor 21. The control apparatus of the present invention comprises briefly means 22 and 23 for sensing a vehicle entering the car wash line; means 24 sensing units of conveyor movement and providing a series of pulses corresponding therewith (see additionally FIG. 6); means generally designated by numeral 26 having a plurality of outputs 27 related to units of conveyor movement and being energized by a signal coming from sensing means 22 and 23 and by electric pulses deriving from means 24, outputs 27 being thereby serially energized with the movement of a vehicle along conveyor 21 (as will be more fully explained below), the energized outputs serving to image the vehicle and its movement over the length of the car wash line; means responsive to the energized outputs enabling the car wash operator to selectively energize the car wash devices in advance of a vehicle entering the respective stations associated with the effected devices and additionally enabling him to selectively de-energize those same devices following the vehicle leaving said stations (more fully delineated below). Thereby the control apparatus may cause the devices to be energized for a period of time prior to the entry of a vehicle long enough for the devices to come up to full operating power before the vehicle enters the device and yet keep the device in an energized state until the endmost portion of the vehicle has left the device. Integrated with the above apparatus is means for prolonging the operation of one or more of the car wash devices so long as a vehicle is in at least certain devices upstream from the concerned device (see FIG. 3). This is an especially advantageous feature for those devices which are costly to cycle on and off and are subjected to a considerable degree of wear and tear in the process. For instance, such a device is a car wash blower for drying washed vehicles. The above apparatus has additionally integrated therewith means enabling the car wash operator or an attendant to preset, at the time a vehicle is introduced to the line, one or more of the downstream car wash devices to subsequently energize for that particular vehicle only (see FIG. 4). This feature is especially advantageous for those car wash operations which are unnecessary to the normal washing and drying of a vehicle and yet are desired by certain customers, for instance, hot or cold waxing. Additionally, this means enables the car wash line to adjust to an unusual situation at the command of the car wash operator. For instance, many car wash devices are designed for vehicles of usual size and must be adjusted on a selective basis when much larger or much smaller vehicles are introduced to the car wash conveyor line. One such example is the brush which cleans the top of the average vehicle and which must be raised when a truck or similarly taller vehicle enters the line.

Means 22 and 23 may take a variety of forms. For instance, the usual mechanical rod or wand attached to a conventional limit switch may be employed. The necessary condition is that the means must be activated upon entry of a vehicle into the car wash line at which point the means is located and de-activated upon the endmost section of the vehicle leaving said location of the means. In this manner the means measures the length of the vehicle, an important input to the supporting electronics which will be more clearly set forth below. In the preferred embodiment, means 22 and 23 take the form of an electromagnetic wave source and its concomitant electromagnetic wave detector, a conventional photocell apparatus, which are positioned such that the entry of a vehicle into the conveyor line interrupts the propogation of the wave from the source to the detector. It has been found that a modulated wave source and a receiver selectively responsive to the modulated wave function very satisfactorily. Problems associated with ambient lighting conditions and spurious triggering of the detector are entirely eliminated, the detector responding only to the modulated signal. A commercially available Photomation TR9-L source and TR9 -01 detector having a 2,000 cycle per second modulated beam may be employed.

Integral with the photodetection apparatus is a magnetically actuated switch, i.e., a relay (not shown), which, in the preferred embodiment, dispatches upon the breaking of the modulated wave a 5-volt "logical-one" signal through an anti-bounce network comprising diode 28, R-C circuit generally designated 29, and buffer 31 to the steering input of shift register 26, to be more fully explained below, and to the special waxer circuitry 32 and 33 (providing in this embodiment the "selective-activation" function discussed above) at point J in FIGS. 2 and 4.

Means 24 providing pulses corresponding with units of conveyor movement may also take a variety of forms. In this case the pulses are provided by a shaft encoder shown clearly in FIG. 6. Conveyor sprocket drive shaft 34, carrying conveyor sprocket 36 (which in turn drives the conveyor line), has attached thereto permanent magnet 37 which rotates with drive shaft 34 in close proximity to firmly mounted magnetically sensitive reed switch 38. Where a "horse shoe" magnet is used, as here shown, a double pulse will occur on each passage of the magnet. In the present structure R-C network 39 is designed with a long time constant, on the order of approximately 2 seconds, which acts to prevent the second pulse from interacting with the remainder of the circuitry. This has been found to be necessary due to the nature of the particular shaft encoder used in the preferred embodiment. Additionally, diode 41 prevents the charge on the capacitor in R-C network 39 from discharging back into the line capacitance of the wire used to connect reed switch 38 to the typically remotely stationed electronics comprising the bulk of the present invention. Once again, buffer 42 is provided as an interface between the shaft encoder of FIG. 6 and supporting electronics to be delineated below.

Means 26 is provided by a serial input, parallel output shift register which, in this case, comprises a plurality of eight-output, serial input, parallel output shift registers connected in tandem. Shift register 26 derives its 5-volt supply voltage from power supply 25. The initial steering (or control) input of the shift register, designated S1 in FIG. 2, derives its input signal from photodetection apparatus 23 described above, and hence comes to a 5-volt logical-one level whenever a vehicle is interrupting the beam propagated by source 22 and received by detector 23. This "logical-one" level is serially clocked to the shift register outputs in the usual fashion by means of pulses deriving from shaft encoder 24 described above and connected to clock inputs generally designated CK in FIG. 2. The thereby energized outputs of the shift register will be advanced step-by-step along the series of shift register outputs with the continued rotation of the conveyor sprocket drive shaft and hence the progress of the vehicle along the conveyor line. It should be noted, however, that a "logical-one" level will be entered and subsequently advanced along outputs 27 only so long as the beam eminating from photo source 22 is interrupted in its transit to photodetector 23 (due to the presence of a vehicle entering the line). In this fashion then, outputs energized to a "logical one" level among the plurality of outputs 27 image not only the movement of the vehicle throughout the conveyor line but its length as well.

Steering inputs S2 through S6 are, of course, each connected to the serially last output 27 of the preceding shift register unit. In addition, the number of outputs 27 is determined by the length of the conveyor line and the distance travelled by the conveyor upon each rotation of conveyor sprocket drive shaft 34. The logical state at a given one of outputs 27 will be advanced to the subsequent output upon each rotation of shaft 34. Finally, in the present structure any existing preset or clear inputs (not shown) on the shift register units are, of course, connected to a 5-volt level so as to constantly disable the preset and clear inputs.

In order to accomplish the efficient energization and de-energization of the devices stationed along the car wash line such that the devices have reached full operating power prior to the time a vehicle reaches the respective devices and yet requiring said devices to be energized throughout the entire duration of passage of the vehicle through the devices, OR gates 43 each comprising, in the usual fashion, a NOR gate in series with an invertor are provided. The OR gates are connected by means of apparatus to be more fully explained below to a plurality of the outputs 27 of shift register 26. Each of the plurality of OR gates 43 serve an associated car wash device. When either or both of the two inputs to the OR gate reaches a 5-volt "logical-one" level, the output of the OR gate will be correspondingly at a "logical-one" level.

The operation of the OR gates and associated driving circuitry 44 for devices 46 function in operation as follows. As a vehicle moves along the car wash line, it is correspondingly imaged by the outputs 27 of shift register 26 which are energized as has been described above. Therefore, as the frontmost portion of the vehicle enters a designated device, there will be a corresponding energized output of shift register 26 representing the frontmost portion of the car at that instant and hence the location of the device of concern. Therefore, for instance, output 47 of FIG. 2 might be connected to input 48 of one of OR gates 43. This connection would insure that the device of concern would energize (by means of apparatus set forth below) at the time the frontmost portion of the vehicle entered the device and would not be de-energized until the series of energized shift register outputs corresponding with the length of the vehicle had been clocked and advanced past output 47. However, if the device were to be energized at the instant the frontmost portion of the vehicle entered the device, the device would most likely not have come to full operating power until the vehicle had been carried by conveyor 21 through several feet of the device.

In order to solve this problem, output 49, for instance, representing a position on the car wash line several feet in advance of the position represented by output 47 might be connected to input 51 of the OR gate. Since output 49 will be energized prior to the energization of output 47 caused by a vehicle traveling down the conveyor line, the car wash device associated with the OR gate will be itself energized and allowed to reach full operating power before the vehicle reaches the device of concern.

Of course, if a car wash device has a quick start-up time, the car wash operator can use the above-described circuitry to conserve power and water by connecting only one of outputs 27 to the OR gate associated with the device, thereby causing the device to energize when the frontmost portion of the vehicle reaches the device and de-energize as the endmost portion leaves the device. This technique is accomplished very simply by connecting together the inputs of the associated OR gate as has been illustrated in FIG. 2 at 52.

It should be noted that the "selective-activation" or waxer circuitry of FIG. 4, explained below, has incorporated therewith OR gate 53 which performs the function of OR gates 43 of FIG. 2, the OR gates 43 of FIG. 2 associated with the waxer devices having their inputs wired together at 54 and 56 so as to render the OR function of those OR gates inoperative, OR gate 53 serving this purpose.

Figure 5:
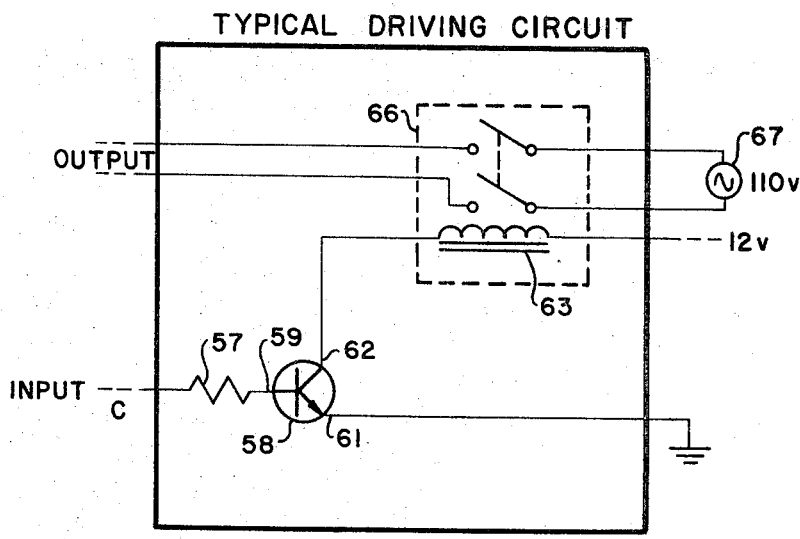
FIG. 5 is a circuit diagram of apparatus providing driving power for the car wash devices.

Also forming a part of the means for energizing and de-energizing the car wash devices is driving circuitry 44. A typical driving circuit is shown in FIG. 5. The input, designated C in the FIGURE, derives its signal from the OR gate associated with the driver and correspondingly with the car wash device. This input signal is either a 5-volt "logical-one" or a "logical-zero" represented by a small voltage in the neighborhood of zero volts. The signal at the input of the driving circuit passes through current limiting resistor 57 which is connected to base 59 of NPN drive transistor 58. The emitter 61 of drive transistor 58 is connected to ground with the collector 62 connected to coil 63 which in turn is connected to 12-volt power supply 64 of FIG. 2. Upon the energization of coil 63 produced by a "logical-one" applied at base 59 of drive transistor 58, normally open electromechanical relay switch 66 closes supplying operating power 67 to devices 46. (Switch 66 is here shown as an electro-mechanical relay but it is understood that it may be a solid state device among other things.)

As an additional convenience manual override switches 68 are provided to serve in case of circuit malfunction and to provide a back-up for the "selective-activation" or waxer circuitry in case the car wash attendant forgets to actuate the waxer circuitry in the manner explained below.

In order to accomplish the easy programming of the control apparatus by installation personnel or the car wash operator to suit the needs of the specific car wash or to provide adjustments in the case of alterations in the car wash layout, patch panel 69 is provided. Patch panel 69 is an apparatus having a plurality of inputs 71 to which are permanently connected outputs 27 of shift register 26. Additionally provided on patch panel 69 are a plurality of output terminals 72 permanently connected to OR gates 43 and output terminals 73 permanently connected to the waxer circuitry 32 and 33 and the blower circuitry 74. Finally, patch panel 69 incorporates conductors 76 provided with plugs for insertion into jacks integral with inputs 71 and output terminals 72 and 73 by means of which installation personnel or the car wash operator may manually selectively interconnect inputs 71 with output terminals 72 and 73 and, correspondingly, interconnect output terminals 72 with output terminals 73. In this fashion, the car wash operator is able to adjust the timing of the energizing and de-energizing of his car wash devices. Installation personnel, correspondingly, can easily install and program the control apparatus for a wide variety of car wash layouts by merely manually connecting plugs on conductors 76 with the jacks of inputs 71 and output terminals 72 and 73.

Figure 3:
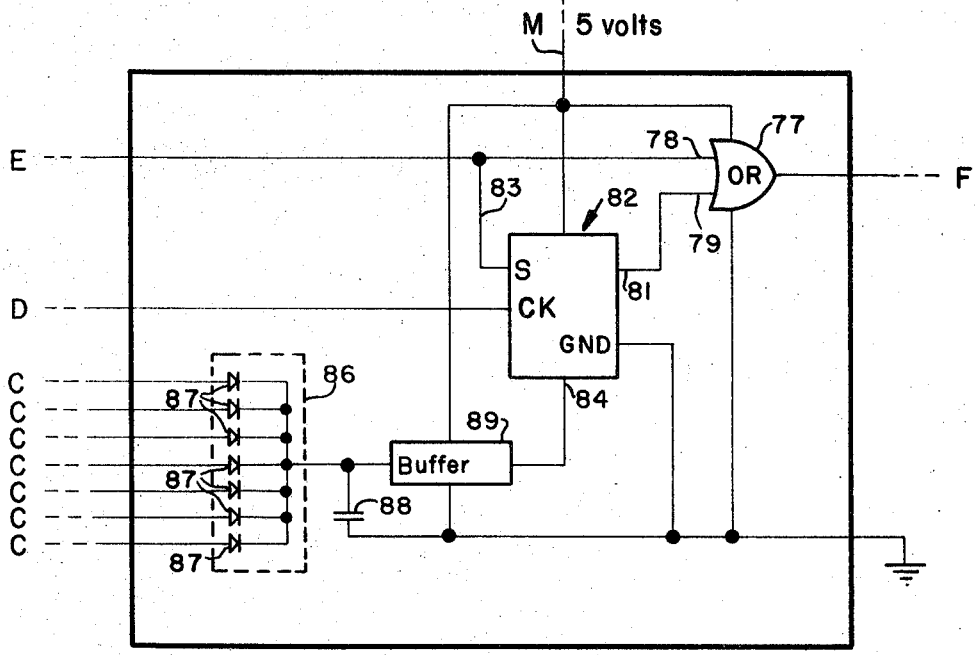
FIG. 3 is a circuit diagram of the means performing the prolongation function in accordance with the present invention.

In order to provide the control apparatus of the present invention with the capability of prolonging the operation of an energized device not only when a vehicle is in the car wash device itself but also when vehicles are in other car wash devices and approaching the device of concern, means 74, better shown in FIG. 3, is provided. Means 74 is typically used in conjunction with the heavy machinery of the final blower which dries the car at the end of the car wash process. Frequent cycling on and off of this piece of machinery results in an inordinate amount of power consumption and undue wear and tear on the machinery.

Means 74 must serve a dual function. First, it must serve to initially energize the affected device, hereinafter designated "the blower" for convenience, upon the entry of a vehicle into the blower area. Additionally, once the blower is operating, means 74 must prolong its operation when other vehicles are in other devices upstream from the blower and approaching said blower. Therefore, in order to satisfy the first function, means 77, in this case an OR gate, is provided. Means 77 derives one of its inputs 78 from and is responsive to the shift register output 27 representing the position on the line at which the car wash operator wishes the blower to energize. This connection is generally designated E in FIG. 2 and FIG. 3 and corresponds to the patch panel input 71a in FIG. 2. Since output F of OR gate 77 is connected by means of conductor 76a to OR gate 43a in FIG. 2, the circuit is complete through to the blower and the blower therefore will energize in the usual fashion. The de-energization of the blower is accomplished as usual as set forth above for the case when only one vehicle is in the car wash line.

However, OR gate 77 has a second input 79 which, when energized, acts as a surrogate for energized input 78. Thus, when input 79 is energized, the associated circuitry of FIG. 2 functions as if a vehicle were present in the blower device. Input 79 of OR gate 77 is connected to output 81 of D-type flip-flop 82.

Output 81 can be "latched" into a "logical-one" level when a vehicle is in other car wash devices preceding the blower as follows. The energization of conductor E in FIG. 3 to a "logical-one" level will cause the steering (or control) input S of flip-flop 82 to rise to a logical one level because conductor E is also connected to steering input S by means of conductor 83. Within approximately 100 nanoseconds thereafter, flip-flop 82 will be clocked because input D of FIG. 3 connected to the clock input CK of the flip-flop is in reality the completion of a feedback loop (from input E through OR gate 77 and additionally through conductor 76a and OR gate 43a of FIG. 2) causing a short propogation delay in the signal input at E. This feedback loop is necessary because flip-flop 82 must be clocked at a time subsequent to the time the steering input S reaches a "logical-one" level.

If clear input 84 of flip-flop 82 is at a "logical-one" level prior to the time the steering input S and the clock input CK reach a "logical-one" level, the logical-one at steering input S will be clocked through to output 81. Output 81 will thereafter be latched to a logical-one level (causing the blower to remain in an energized state) until clear input 84 falls to a "logical-zero" level. Therefore, under the above conditions the operation of the blower will be prolonged until clear input 84 falls to "logical-zero."

Figure 2:
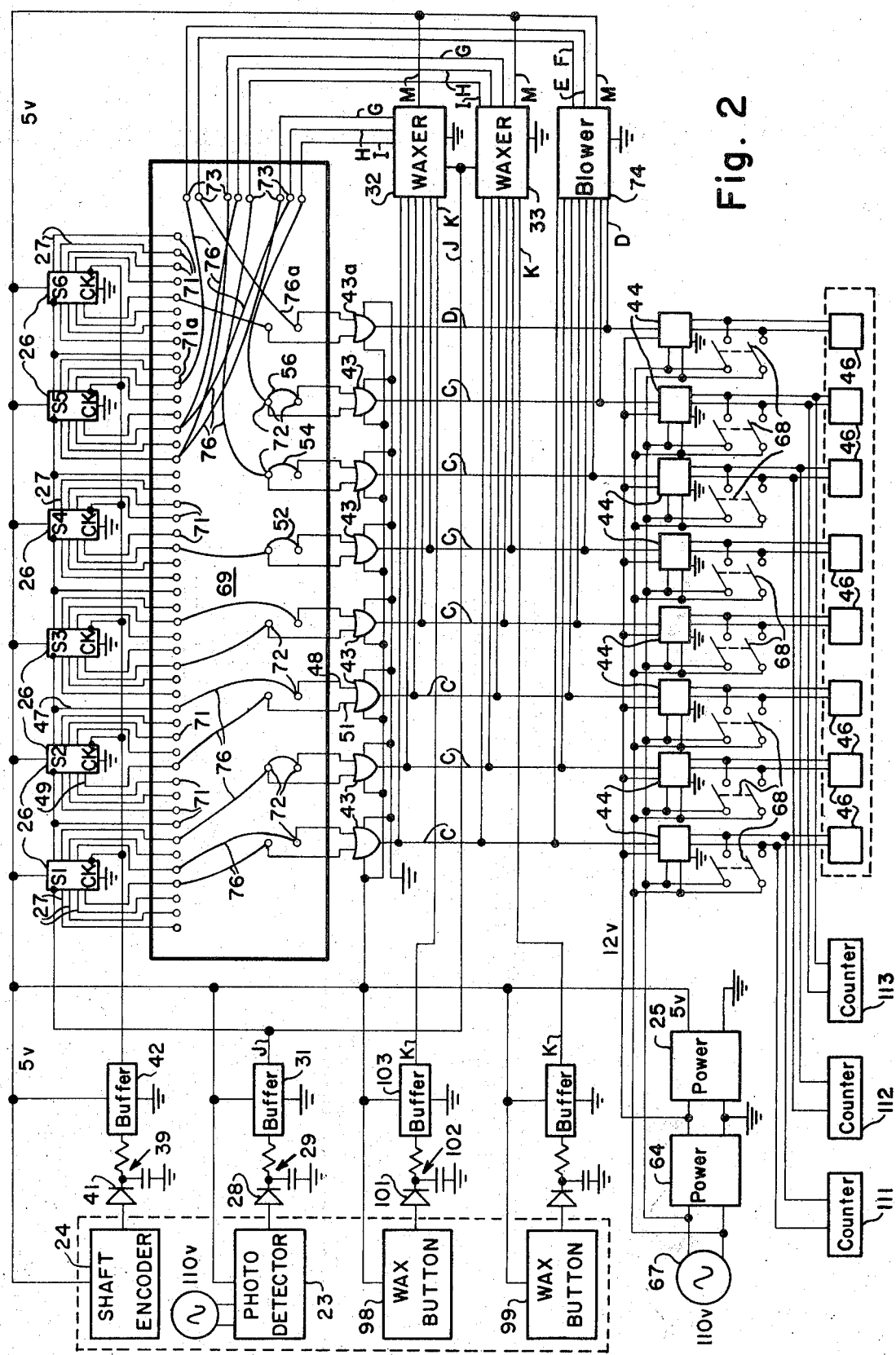
FIG. 2 is a partial circuit diagram of the control apparatus of the present invention.

Clear input 84 is connected to and derives its signal from inputs C of FIG. 3 which are in turn connected to OR gates 43 of FIG. 2 with the exception of OR gate 43a thereof. Inputs C of FIG. 3 are connected to electrical apparatus generally represented by 86 of FIG. 3 providing a logical OR function for the C inputs. Electrical apparatus 86 is comprised of a plurality of diodes 87 connecting each of inputs C to clear input 84 as shown in the FIGURE. Thus, when any of OR gates 43 have passed a "logical-one" therethrough (due to the presence of a vehicle activating a device prior to the blower device on the car wash line), "OR apparatus" 86 will process a logical-one level through to clear input 84 enabling a subsequent logical-one signal at steering input S (and hence at clock input CK) to be clocked through and latched at output 81 until clear input 84 has fallen to a "logical-zero" level. Under the above conditions then, the operation of the blower will be prolonged until all vehicles which have caused at least one of inputs C to reach a "logical-one" level have passed through the blower device. It should be noted that a necessary condition for the proper functioning of the prolongation means of FIG. 3 is that the car wash line be physically laid out and constructed such that a vehicle passing down the line always causes at least one car wash device to be operating at each instant of its transit.

Capacitor 88 has been found empirically to be necessary to the proper functioning of the circuit. Capacitor 88 in conjunction with the input impedance of buffer 89 must provide a time constant greater than approximately one millisecond. It is assumed that the network composed of capacitor 88 in conjunction with the input impedance of buffer 89 acts as a transient filter to suppress shift register transition noise. Additionally, buffer 89 functions in the usual fashion to provide an interface between clear input 84 of flip-flop 82 and the circuitry providing the signal to clear input 84.

In order to provide the present invention with the capability of allowing the car wash operator to optionally preset a designated device to energize at a downstream location and at a time subsequent to the introduction of the vehicle of concern into the car wash line, means 32 and 33 are provided. This "selective-activation" function, hereinafter designated the "waxer" for convenience, permits the car wash operator to give special treatment to a particular vehicle (e.g., waxing or accommodation of car wash device apparatus to vehicles of unusual size) and yet not have to monitor the progress of the vehicle through the car wash line to the station at which that vehicle is to receive special treatment. Means 32 and 33 could represent hot and cold wax functions, respectively, which may be preset by the car wash operator at the initiation of a vehicle to be waxed into the car wash line and thereafter automatically controlled as below described.

Figure 4:
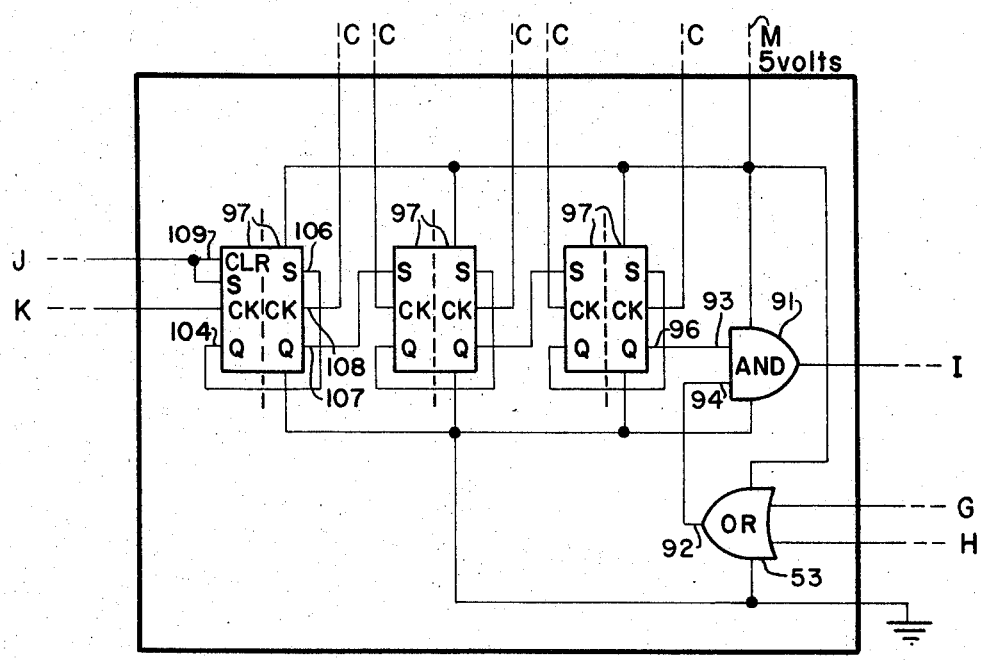
FIG. 4 is a circuit diagram of the means performing the selective activation function of the present invention.

Both the hot wax circuitry and the cold wax circuitry are identical and are more fully illustrated at FIG. 4. OR gate 53 of FIG. 4 serves the same function for the waxer devices as OR gates 43 do for the other car wash devices, as has been mentioned above, i.e., the timing of the energization and de-energization of the waxing device upon the approach and passage of a vehicle. However, AND gate 91 is interposed between OR gate output 92 and AND gate output designated I in FIG. 4 and connected through one of OR gates 43 and drivers 44 to the waxing device. The presence of AND gate 91 adds an additional condition to the energization of the waxing circuitry, which is that input 93 must, simultaneously with input 94 deriving from OR gate output 92, be at a "logical-one" level. Input 94 will, of course, be at a "logical-one" level upon the arrival of any vehicle at the waxing device energization position.

Input 93 to AND gate 91 is connected to output 96 of a signal stepping apparatus here comprising a plurality of dual D-type flip-flops 97. The flip-flops 97 shown in FIG. 4 have their steering (or control) inputs generally designated S, their clock inputs generally designated CK, and their outputs generally designated Q. The output Q of each of flip-flops 97 is connected to the serially next flip-flop steering input S such that the logical state at the output of a designated flip-flop 97 will be that entered at the steering input S of the subsequent flip-flop. Thus, a logical level entered to the first flip-flop steering input can be stepped through to output 96 with the proper clocking of each of flip-flops 97.

The signal stepping apparatus comprising flip-flops 97 is energized by photodetector 23 and by either wax button 98 or wax button 99 (see additionally FIG. 1) in accordance with the wishes of the customer for either a hot or a cold wax finish on his vehicle. Manually operated wax buttons 98 and 99 may take a variety of forms. As here shown they comprise simply a manually operated switch which remains closed so long as a push-button remains depressed. The signal from wax button 98 is propogated through an anti-bounce network comprising diode 101 and R-C circuit generally designated 102. From there the signal is interfaced by buffer 103. These latter circuit elements function in the same fashion as do the corresponding circuit elements associated with the photodetector 23 described above. Identical circuitry is provided as an interface between wax button 99 and waxer circuitry 33.

Photodetector 23, as has been previously noted, is connected as an input to the stepping means comprising flip-flops 97. Specifically, input designated J in FIG. 4 derives a signal from the photodetector 23 upon the entry of a vehicle into the photodetection area and is connected to both the steering input S and the clear input CLR of the serially first of flip-flops 97. Each vehicle entering the line is thereby a candidate for the special treatment for which the circuitry of FIG. 4 is designed, as shown here, waxing. In order to initiate the process which will result in a given vehicle being waxed at the downstream waxing device, the car wash operator or his attendant simply depresses wax button 98 or 99 during the time that the vehicle is interrupting the propogation of the wave from source 22 to detector 23, thereby causing a clocking signal to arrive at point K of FIG. 4 and advancing the "logical-one" level from initial steering input S to the serially first Q output 104 of flip-flops 97. This process presets the circuitry of FIG. 4 for later activation of the waxer.

The remainder of the circuit elements are chosen and wired so as to be a very inexpensive means for stepping the preset signal through the series of flip-flops 97 following the progress of the vehicle as it advances along the conveyor line toward the waxer device. The arrival of the signal at Q output 104 simultaneously enters that same signal at steering input 106 to be subsequently clocked to output 107 as the vehicle advances along the line as follows. Clocking inputs of the stepping apparatus subsequent to the clocking input deriving its signal from point K of FIG. 4 are connected to points labeled C in the FIGURE. Referring to FIG. 2 it will be seen that points C are connected to a plurality of the outputs of OR gates 43 prior to those gates 43 servicing the waxing devices. As here shown, for example, the activation of the first car wash device caused by the entry of the vehicle to be waxed into that device results in a "logical-one" appearing at the output of the serially first of OR gates 43 and, correspondingly, a clock pulse at clock input 108 of FIG. 4. The clock pulse in turn advances the "logical-one" at steering input 106 to output 107. Thus, in this fashion, as devices upstream on the conveyor line from the waxer are energized, the signal initially clocked-in by depression of wax button 98 or wax button 99 is stepped to output 96 imaging the movement of the vehicle to be waxed along the line. Therefore, output 96 reaches a "logical-one" level just prior to the time the car to be waxed reaches the waxer device. When the waxer device is reached, a "logical-one" level will appear at the output 92 of OR gate 53, as has been previously noted. Input 93 and 94 to AND gate 91 thereby both being energized, point I of FIG. 4 will reach a "logical-one" level, activating, through the associated circuitry of FIG. 2, the waxer device.

It should be noted that because photodetector 23 is not only connected to the initial steering input of flip-flops 97 but also to clear input 109, the serially first of flip-flops 97 will be cleared, i.e., have its Q output 104 fall to a "logical-zero" when the wave from source 22 to detector 23 is no longer broken (due to the removal of the vehicle from the photodetection area). Therefore, when a subsequent vehicle, not to be waxed, passes through the car wash line, it will clock the "logical-zero" at output 104 through to output 96 thereby preventing the operation of the waxer for that vehicle. The waxer circuitry of FIG. 4 is, therefore, self-clearing.

It should be further noted that, as here shown, the vehicle to be waxed must arrive at the point of energization of the first car wash function prior to the time it ceases to interrupt the wave from source 22 to detector 23. Were this not the case, the serially first of flip-flops 97 would clear as described above before the "logical-one" at output 104 (and hence steering input 106) could be clocked to output 107. Additionally, as here shown, the wax button must be depressed prior to the time the vehicle to be waxed has entered and energized the first car wash function. Were this not the case, the logical state at steering input 106 would be a "logical-zero" at the time of arrival of the clock pulse at clock input 108 caused by the energization of the first car wash device.

Finally, the vehicle to be waxed must have passed through the waxing device prior to the time that a trailing vehicle, not to be waxed, energizes the device immediately prior to the waxer and hence causes output 96 to fall to a "logical-zero." The fact that output 96 must be a "logical-one" throughout the period of transit of the vehicle to be waxed through the waxer device dictates this condition. Therefore, the device immediately prior to the waxer and the waxer itself must be positioned closely enough together and/or the vehicles traversing the line must be spaced far enough apart, such that output 96 remains at a "logical-one" level for the necessary time period. This is typically the case in modern car wash installations.

It can be seen that the above described circuit design for the "selective-activation" function of the control apparatus of the present invention requires only a few very inexpensive and easily wired circuit elements, yet is very time-saving and efficient in serving its purpose.

As an even further convenience to the car wash operator, electromechanical counters 111, 112, and 113 are provided which advance upon each energization of the car wash device to which they are connected. When connected as shown in FIG. 2, counter 111 monitors the total number of vehicles passing through the line while counters 112 and 113 monitor the number of hot and cold wax finishes applied.

I claim:

1. A control apparatus for a car wash having a vehicle conveyor for transporting a vehicle to be washed to a plurality of stations in a car wash line equipped with electrically controlled car wash devices comprising:
   means sensing a vehicle entering the line and having a plurality of electrical outputs representing units of length of said line and being serially energized with the movement of said vehicle, said energized outputs continuously imaging the vehicle and its movement over the length of said line;
   a plurality of electrical switches one adapted for connection to each of said devices; and
   electrically energized means for activating said switches and being connected to said outputs to energize at least one of said devices in advance of the vehicle entering the station associated with said one device and for deenergizing said one device following the vehicle leaving said last named station whereby said one device will be energized for a period longer than the duration of passage of the vehicle through said last named station.

2. A control apparatus as defined in claim 1, said first named means including a serial input, parallel output shift register, and said electrically energized means responding to a plurality of said energized outputs in energizing and deenergizing said one device.

3. A control apparatus as defined in claim 2 wherein said electrically energized means includes electrical apparatus providing a logical OR function for said one device and responding to a plurality of said energized outputs.

4. A control apparatus as defined in claim 1, said electrically energized means including a patch panel having a plurality of inputs connected to said outputs and a plurality of output terminals connected to said devices; and
   conductors manually selectively connected to said inputs and terminals.

5. A control apparatus as defined in claim 4, said first named means detecting and monitoring the passing of a vehicle so as to indicate the length of the vehicle; and
   said electrically energized means including electrical apparatus providing a logical OR function for said one device, and responding to a plurality of said energized outputs.

6. A control apparatus as defined in claim 1 and at least one of said devices being optionally employed for selected vehicles;
   electrical apparatus providing a logical AND function connecting said last named device to its energizing output;
   manually operated means for determining the energizing of said last named device and generating an electric signal when operated; and
   signal stepping apparatus connected to said manually operated means and having an output connected to said electrical apparatus and being connected for stepping a signal to said electrical apparatus as each said selected vehicle reaches said last named device.

7. A control apparatus as defined in claim 1, said first named means including a modulated wave source for propogating a modulated wave and a receiver selectively responsive to said wave, said source and receiver being mounted for sensing a vehicle entering the line.

8. A control apparatus for a car wash having a vehicle conveyor for transporting a vehicle to be washed to a plurality of stations in a car wash line equipped with sudsing, rinsing, brushing, waxing, drying devices and the like, which are sequentially energized as said vehicle progresses down said line, comprising:
   means sensing a vehicle entering the line and having a plurality of electrical outputs representing units of length of said line and being serially energized with the movement of said vehicle, said energized outputs continuously imaging the vehicle and its movement over the length of said line;
   means responsive to said energized outputs for energizing one of said devices; and
   electrical means responsive to the energizing of devices upstream on said line from said one device and connected for prolonging the operation of said one device so long as at least certain of the upstream devices are energized.

9. A control apparatus as defined in claim 5, said second named means functioning to energize said one device in advance of the vehicle entering the station associated with said one device and to deenergizing said one device following the vehicle leaving said last named station, said one device being thereby energized for a period longer than the duration of passage of the vehicle through said last named station.

10. A control apparatus as defined in claim 5, said last named electrical means including:
    a flip-flop having a steering input, an output and a clear input;
    a first electrical apparatus providing a logical OR function connected to said one device;
    said steering input being connected to one of said electrical outputs for said one device and to said first electrical apparatus; and
    a second electrical apparatus providing a logical OR function connected to said electrical outputs connected to said outputs for devices upstream from said one device and to said clear input.

11. A control apparatus for a car wash having a vehicle conveyor for transporting a vehicle to be washed to a plurality of stations in a car wash line equipped with electrically controlled car wash devices comprising:
    means sensing a vehicle entering the line and having a plurality of electrical outputs representing units of length of said line and being serially energized with the movement of said vehicle, said energized outputs continuously imaging the vehicle and its movement over the length of said line;
    at least one of said devices being optionally employed for selected vehicles;
    electrical apparatus providing a logical AND function connecting said one device to its energizing output;
    manually operated means for determining the energizing of said one device and generating an electric signal when operated; and signal stepping apparatus connected to said manually operated means and having an output connected to said electical apparatus and being connected for stepping a signal to said electrical apparatus as each said selected vehicle reaches said one device.

12. A control apparatus as defined in claim 11, said first named means being a modulated wave source for propagating a modulated wave and a receiver selectively responsive to said wave.

* * * * *

UNITED STATES PATENT OFFICE
CERTIFICATE OF CORRECTION

Patent No. 3,854,054     Dated December 10, 1974

Inventor(s) Robert O. Conn, Jr.

It is certified that error appears in the above-identified patent and that said Letters Patent are hereby corrected as shown below:

Column 12, Claim 9, line 29, change "5" to ---8---;

Column 12, Claim 10, line 37, change "5" to ---8---.

Signed and Sealed this fourteenth Day of October 1975

[SEAL]

Attest:

RUTH C. MASON
Attesting Officer

C. MARSHALL DANN
Commissioner of Patents and Trademarks